April 17, 1945.  F. B. HALFORD ET AL  2,373,827
MANUFACTURE OF PIECES WHICH ARE SHAPED BY GRINDING
Filed Aug. 3, 1943  2 Sheets-Sheet 1
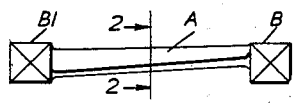
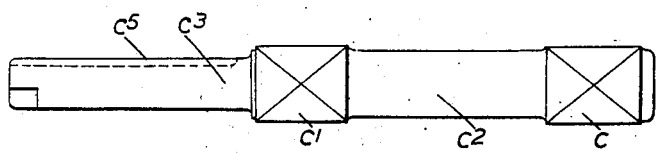
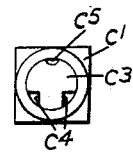
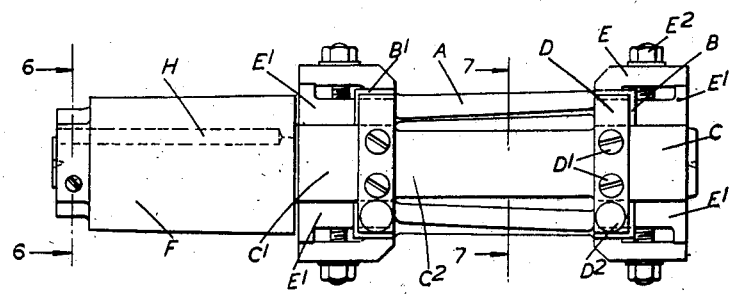
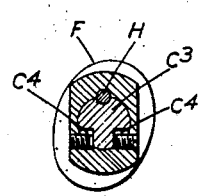
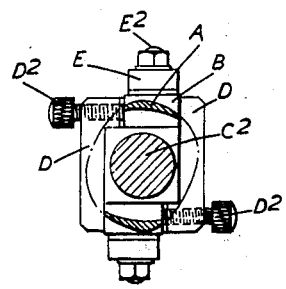

April 17, 1945.   F. B. HALFORD ET AL   2,373,827
MANUFACTURE OF PIECES WHICH ARE SHAPED BY GRINDING
Filed Aug. 3, 1943   2 Sheets-Sheet 2

Patented Apr. 17, 1945

2,373,827

UNITED STATES PATENT OFFICE 2,373,827

MANUFACTURE OF PIECES WHICH ARE SHAPED BY GRINDING

Frank Bernard Halford, Edgware, John Longmuir Penman Brodie, London, and Robert Miller, Edgware, England, assignors to The De Havilland Aircraft Company Limited, Edgware, Middlesex, England, a company of Great Britain Application August 3, 1943, Serial No. 497,240
In Great Britain October 6, 1942

6 Claims. (Cl. 51—101)

This invention relates to the manufacture of pieces which are shaped by grinding so as to give the surface of the piece a determined form. While applicable to the manufacture of pieces of various shapes which may be used for various purposes the invention is more especially intended for the manufacture of turbine blades in which great accuracy is desirable in the shaping of the blade and particularly the back or convex face of the blade in relation to its other surfaces and root portion.

In the method of manufacture according to this invention the piece to be treated has integral with it two similar parts which are accurately machined to rectangular section and are spaced apart with the part which is to be shaped between them, and these rectangular parts are clamped on the side of a mandrel which carries also a form cam and is rotatably mounted on a frame which is rocked to maintain the cam in contact with a follower while the frame is traversed past a grinding wheel and the follower. In the case of a turbine blade the blade is first made with a part at each end which is machined accurately to a rectangular section and each of these two parts is then clamped on the side of a rectangular part of a mandrel which carries on another part a form cam and the mandrel is rotatably mounted on a frame which is rocked to maintain the cam in contact with a follower while the frame is traversed with respect to the grinding wheel and follower. After grinding the blade has one of the rectangular parts at its ends removed while the part at the other end is left and forms the root of the blade. In some cases two blades may be simultaneously made in this way since after grinding the piece may be cut transversely about its mid point each part then constituting a separate blade with the rectangular part on the end thereof forming the root of the blade.

In the apparatus used for carrying out this method of manufacture there is employed in combination a mandrel on one part of which is a form cam, means for clamping to the side of another part of this mandrel two parts of rectangular section which are integral with the piece to be shaped, these parts being spaced apart with this piece between them, a frame on which the mandrel is mounted with means for rotating the mandrel, means for rocking this frame and maintaining the cam in contact with a follower, and means for traversing the frame past a grinding wheel and the follower. The mandrel is of rectangular section at the parts or over the whole of that portion of its length on which is clamped the piece to be ground, this part or parts being conveniently square, while on another part of the mandrel which is otherwise shaped is carried the form cam. The rocking frame which carries the mandrel preferably comprises a rock shaft on which is the main part of the frame, two arms spaced apart and projecting from this part of the frame and each carrying a centre for the ends of the mandrel, gearing by which one of these centres can be rotated from a driving shaft through intermediate gearing on the adjacent end of the shaft on which the frame rocks, and at least one other arm projecting from the main part of the frame with a spring operative on this arm in a direction tending to rock the frame and maintain the form cam in contact with the follower.

This method of manufacture and the apparatus indicated are particularly of use in the making of turbine blades and especially in the case of those blades which have a twist where the back or convex face of the blade may have a complex form.

The accompanying drawings illustrate by way of example how the invention may be carried out in practice when used for the manufacture of a turbine blade. In these drawings:

Figure 1 is a side elevation of the piece as it may be shaped to form a blade from a forging.

Figure 2 is a transverse section on the line 2—2 in Figure 1.

Figure 3 is a side elevation of the mandrel.

Figure 4 is a view of the left-hand end of the mandrel as seen in Figure 3.

Figure 5 is a side elevation of the mandrel with two pieces to be shaped and also the form cam mounted thereon.

Figure 6 is a transverse section on the line 6—6 in Figure 5 looking in the direction of the arrows.

Figure 7 is a transverse section on the line 7—7 in Figure 5 looking in the direction of the arrows.

Figure 8:
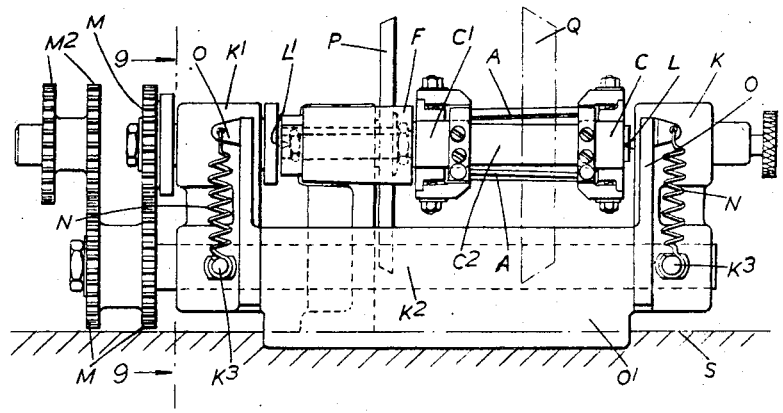
Figure 8 is a side elevation of the apparatus with the mandrel as seen in Figure 5 mounted in position for the grinding operation.
Figure 9:
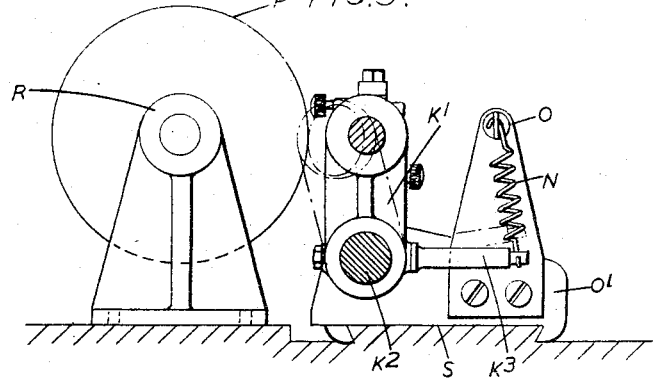
Figure 9 is a transverse section on the line 9—9 in Figure 8 looking in the direction of the arrows.

Referring to Figures 1 and 2, the piece which is to be made into a turbine blade is forged to the general shape required and comprises a centre part A which will constitute the blade itself and two similar rectangular end portions B and B¹. The faces of the parts B and B¹ are machined accurately and they serve to enable the blade part A to be correctly positioned for all subsequent operations which may have to be carried out on it.

In Figures 3 and 4 the mandrel is shown and on that part of the length of the whole mandrel on which the blade piece is to be fixed there are two portions C C¹ spaced apart along a part C², the parts C and C¹ being rectangular in section and preferably square, while the part C² is round, though if desired the whole of this part of the mandrel may be of square section. Conveniently the mandrel is designed to carry on opposite sides two blade pieces which can then be ground simultaneously, though if preferred only a single blade may be operated on. The blade pieces are fixed at each end on the mandrel by two pairs of clamping members. The clamps D forming one of these pairs are L-shaped, as seen in Figure 7, and each is fixed on one flat face of the mandrel, which may be called a side face, by set screws D¹. The end parts B of the blade pieces lie on what may be called the upper and lower faces of the squared parts C C¹ of the mandrel. Thus the end part B of one blade piece will lie, as seen in Figure 7, between the opposed end portions of two clamp members D in one of which is a clamping screw D² and by this means the piece will be held against lateral movement and can be correctly located in that respect. The ends of the blade pieces are held against the upper and lower faces of the mandrel by a second pair of clamping members each of which comprises two parts. One of these parts E rests at one end on the second part E¹ and at the other end is pressed against the blade piece by the stud E² which is screwed into the mandrel. The part E¹ may conveniently be pinned to the mandrel to prevent it from rotating round the stud E² which passes through it. This part E¹ locates the blade piece in the axial direction. By means of these clamps and if necessary with the aid of packing each blade piece can be positioned correctly in the radial and circumferential directions. By suitable machining of the rectangular parts C and C¹ of the mandrel so that they will collaborate with the machined ends B and B¹ of each blade piece accurate positioning can be obtained with relation to the form cam F on the other part C³ of the mandrel. This part C³ is conveniently cylindrical but at its end is cut away to form two oppositely placed recesses C⁴ with flats against which can bear the ends of tangential screws G passing through parts of the cam F and by means of which an exact rotational adjustment of the cam on the mandrel can be effected. After being thus adjusted the cam may be locked in place by drilling a hole between the cam and the mandrel and inserting in this hole a pin H (see Figure 6) which serves as a key. The groove C⁵ thus formed in the mandrel can be seen in Figures 3 and 4.

The apparatus in which the mandrel is carried and the blade piece operated on by the grinding wheel embodies the following features. On arms K K¹ extending from a rockshaft K² and together forming a U-shaped frame, the mandrel C C¹ C² is mounted between centres L L¹ of which the latter is arranged to transmit rotation to the mandrel from a gear wheel M which is driven through intermediate gears M¹ loose on the rockshaft K² from gearing M² on a suitable headstock. By this means the mandrel can be constantly rotated while it is rocked about the shaft K². Pins K³ project from the rockshaft towards its ends where are the arms K K¹ and springs N are connected to the ends of these pins and to fixed brackets O. These springs N cause the whole frame K K¹ K² to rock while the mandrel is being rotated and thus maintain the form cam F in contact with a follower wheel P which is separately mounted coaxially with the grinding wheel Q in a headstock R placed behind the frame. The follower wheel P and the grinding wheel Q are spaced apart in the axial direction in accordance with the relative axial spacing apart of the mandrel and the form cam F. The whole rocking frame K K¹ K² is mounted on a slide O¹ which carries the brackets O and can be traversed on a bed S by suitable means so as to carry the blade pieces along past the grinding wheel Q and the form cam F past the follower P.

With this apparatus it is possible to ensure considerable accuracy in carrying out the improved method of forming turbine blades or other parts adapted for shaping by grinding. The accuracy depends in effect on the accuracy with which the flat surfaces C C¹ are formed on the mandrel, but this is easy to effect. Since it is preferable that each cam F is permanently fitted on its mandrel any initial errors in the form cam can be corrected in the machining of the mandrel and the mandrels are simple and inexpensive. It is easy to ensure the correct relationship in the axial direction as between the cam F and the blade piece A, B B¹ and between the follower P and the grinding wheel Q. When it is desired to change the design of the blade or other part which is to be shaped it is only necessary to provide a new mandrel and mount thereon the suitable form cam. The apparatus as above described may be applied to standard types of grinding machine.

What we claim as our invention and desire to secure by Letters Patent is:

1. In apparatus for use in the manufacture of a piece which is shaped by grinding, the combination of a mandrel, a form cam mounted on one part of this mandrel towards one end, prepared flat surfaces spaced apart along and on another part of the mandrel towards the other end, adapted to receive an especially shaped work-piece having at each end a part of rectangular section, means for clamping these end parts of this piece onto the said flat surfaces on the mandrel, a rocking frame in which the mandrel is rotatably mounted, a follower wheel and a grinding wheel disposed adjacent to the rocking frame with means for rotating the grinding wheel, means for rotating the mandrel in the said frame, means for rocking the frame so as to maintain the said form cam in contact with the said follower wheel and the piece to be ground in a position to be acted on by the grinding wheel, and means for traversing the said rocking frame with the mandrel past the follower and grinding wheels.

2. Apparatus for use in the manufacture of a piece which is shaped by grinding comprising the features set out in claim 1 in which the mandrel is of rectangular section at those parts of its length on which are clamped the end portions of the piece to be ground which are of rectangular section.

3. Apparatus for use in the manufacture of a piece which is shaped by grinding comprising the features set out in claim 1 in which the mandrel is provided on opposite sides with flat surfaces adapted to receive two separate workpieces which are to be similarly shaped, these pieces being clamped on these opposite flat surfaces on the sides of the one mandrel, whereby both pieces are shaped by the same grinding wheel as the mandrel is rotated and traversed past this wheel and past the said follower wheel with which a single cam on the mandrel is maintained in contact.

4. In apparatus for use in the manufacture of a piece which is shaped by grinding, the combination of a mandrel, a form cam keyed on one part of this mandrel towards one end, prepared flat surfaces spaced apart on another part of the mandrel towards the other end, adapted to receive an especially shaped work-piece having at each end a part of rectangular section, means for clamping these end parts of this piece onto the said flat surfaces on the mandrel, a frame which can rock about a centre and comprises end members between which the said mandrel is rotatably mounted, means for rotating the mandrel in the frame through gearing from a source of power, a follower wheel and a grinding wheel carried on a common shaft whose axis is parallel to the axis about which the said frame can rock with the mandrel therein, the grinding wheel and the follower wheel lying respectively adjacent to the piece to be shaped which is on the mandrel and the said form cam on the mandrel, means for rotating the grinding wheel, means operative on the said frame tending to rock it and maintain the said form cam in contact with the said follower wheel and the piece to be shaped in a position to be acted on by the grinding wheel, and means for traversing the said rocking frame with the mandrel therein past the follower and grinding wheels.

5. A method of manufacturing pieces which are shaped by grinding the surface of the piece to a determined form comprising the steps of first forming two similar parts of rectangular section, at the opposite ends of and integral with the workpieces, clamping these rectangular parts to flat surfaces spaced apart along a mandrel rotatably mounted on a rocking frame, on which mandrel is a form cam, and traversing the frame past a grinding wheel and cam follower.

6. A method of manufacturing a turbine blade the surface of which is shaped by grinding to a determined form comprising the steps of machining a rectangular part at each end of the blade blank clamping the two parts to rectangular parts of a mandrel rotatably mounted in a rocking frame, the mandrel having secured thereto a form cam, traversing the frame past a grinding wheel and a cam follower until the blade is formed, cutting off one of the rectangular parts, and forming the root of the blade out of the other.

FRANK BERNARD HALFORD.
JOHN LONGMUIR PENMAN BRODIE.
ROBERT MILLER.